Sept. 8, 1953  J. A. ZINN, JR., ET AL  2,651,284
WAX COATING APPARATUS
Filed June 1, 1950  11 Sheets-Sheet 1
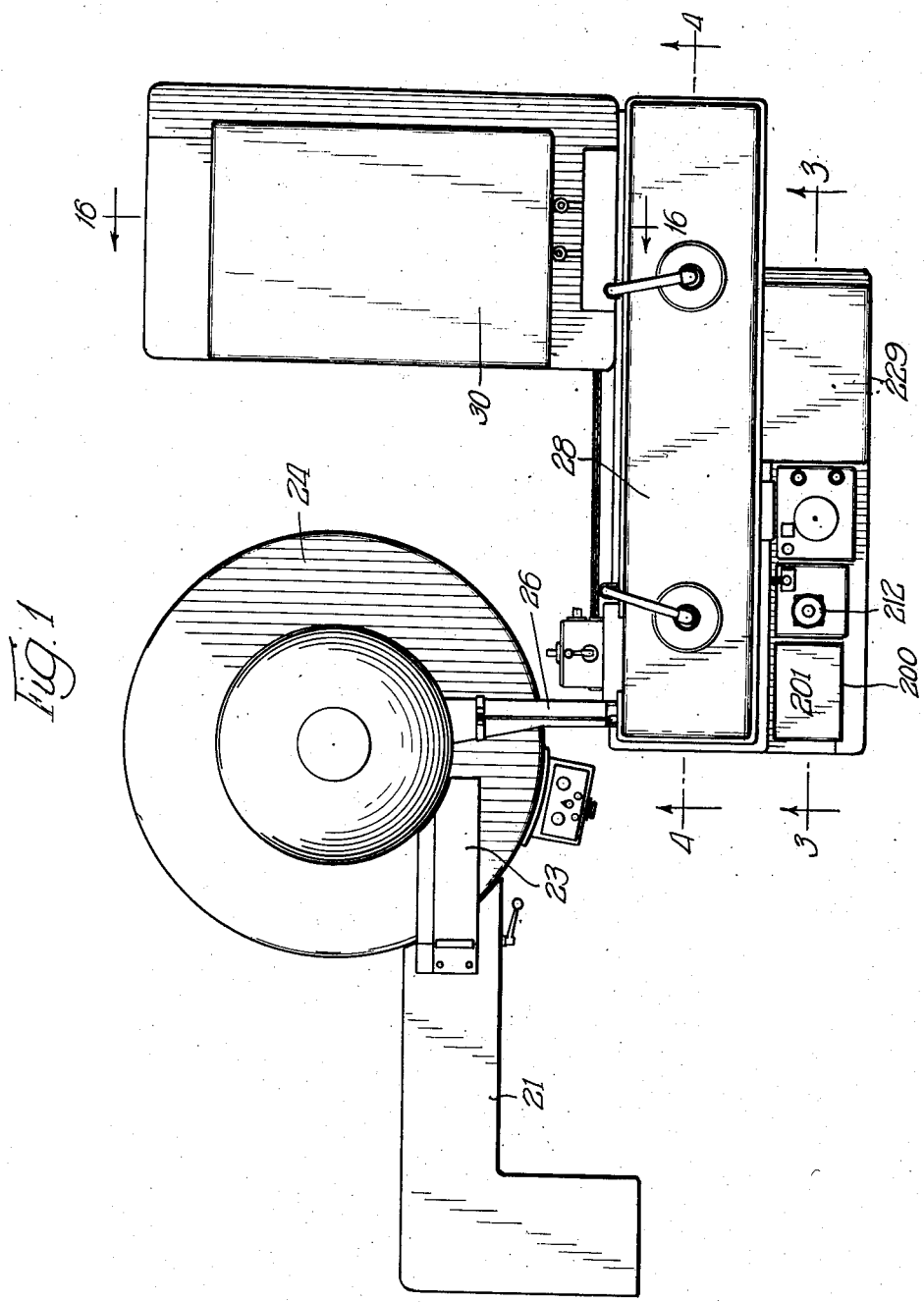
INVENTORS.
Julius A. Zinn, Jr.,
Odd Wennberg,
Jack Swendsen,
By Wilkinson Huxley Byron Hume
attys.

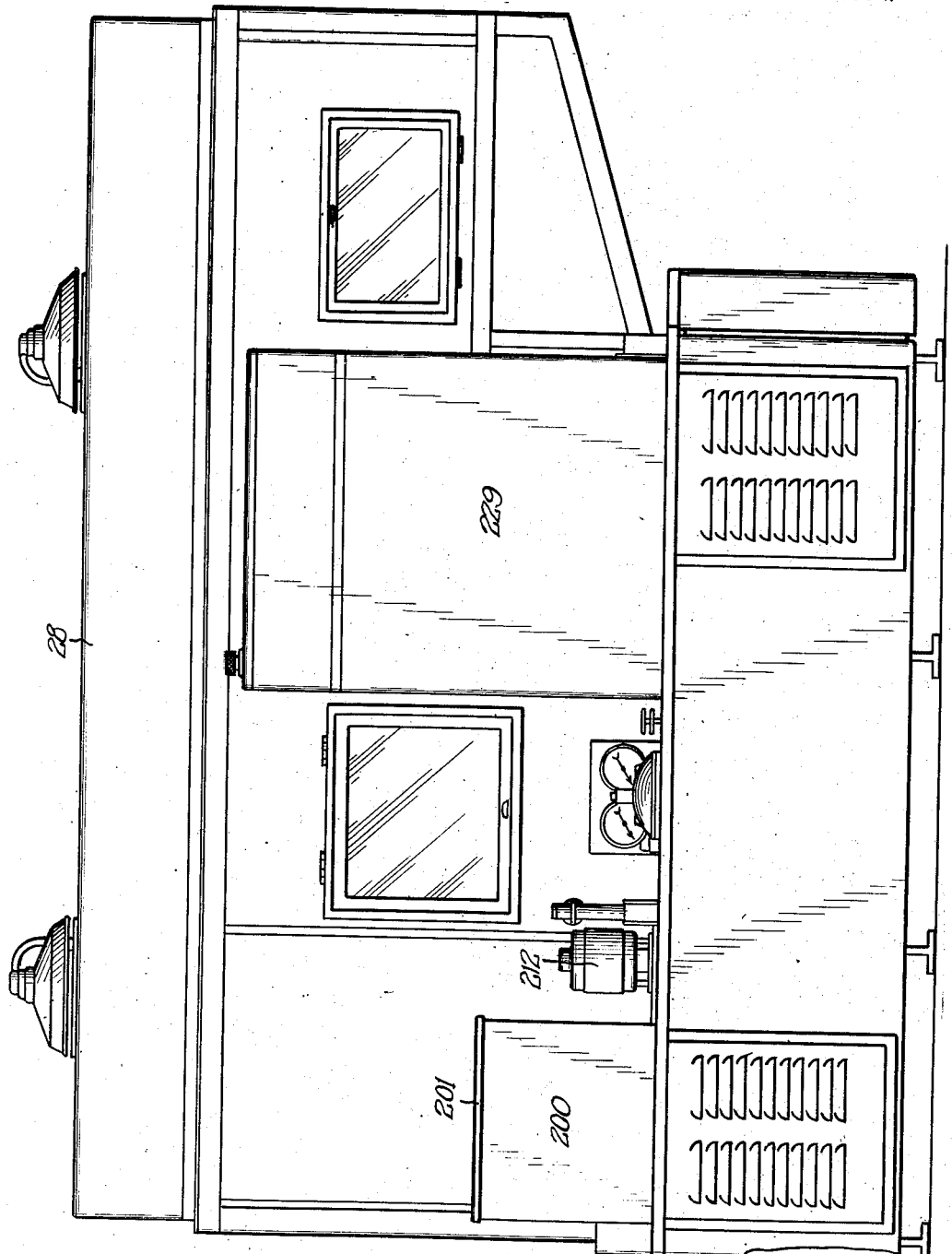

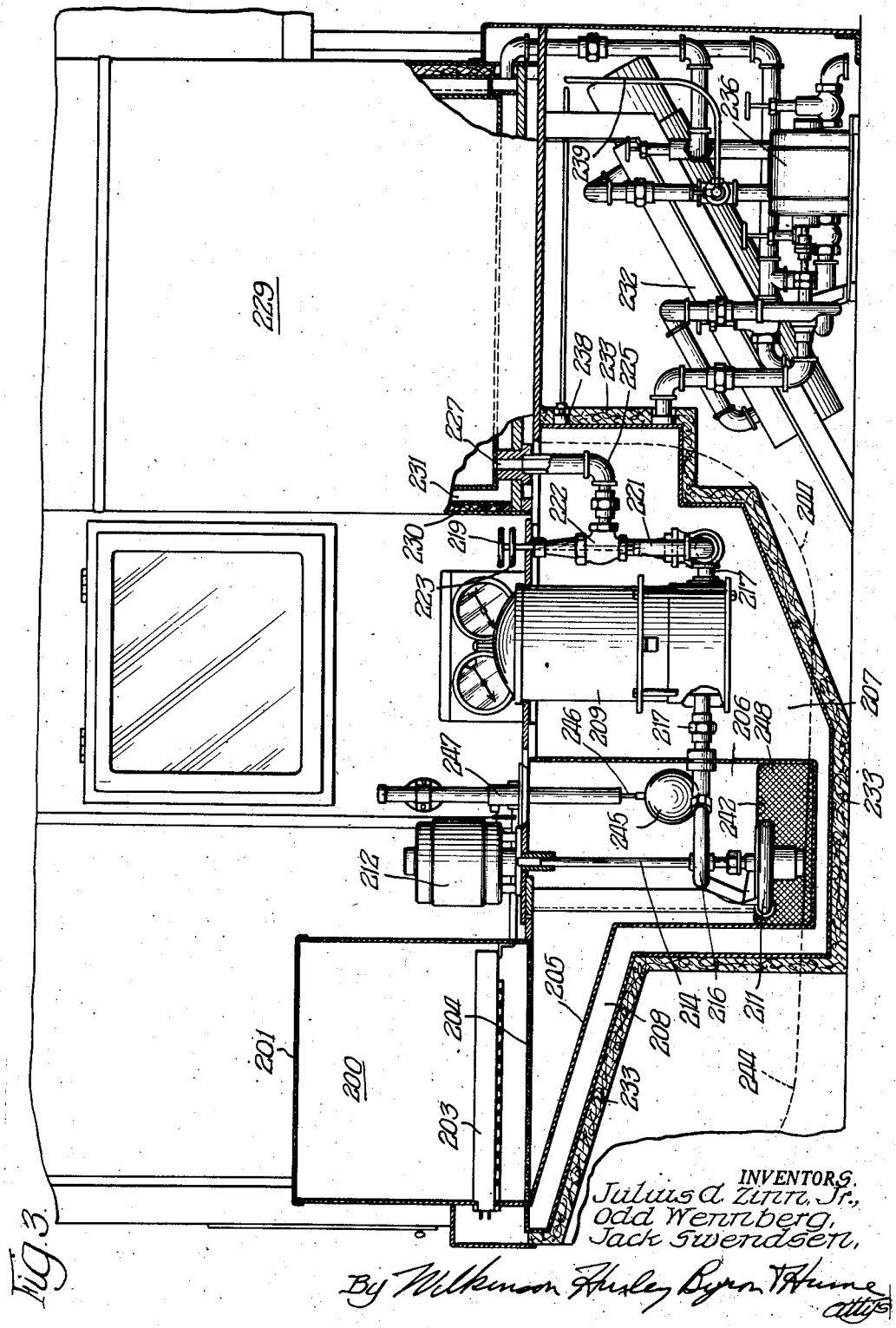

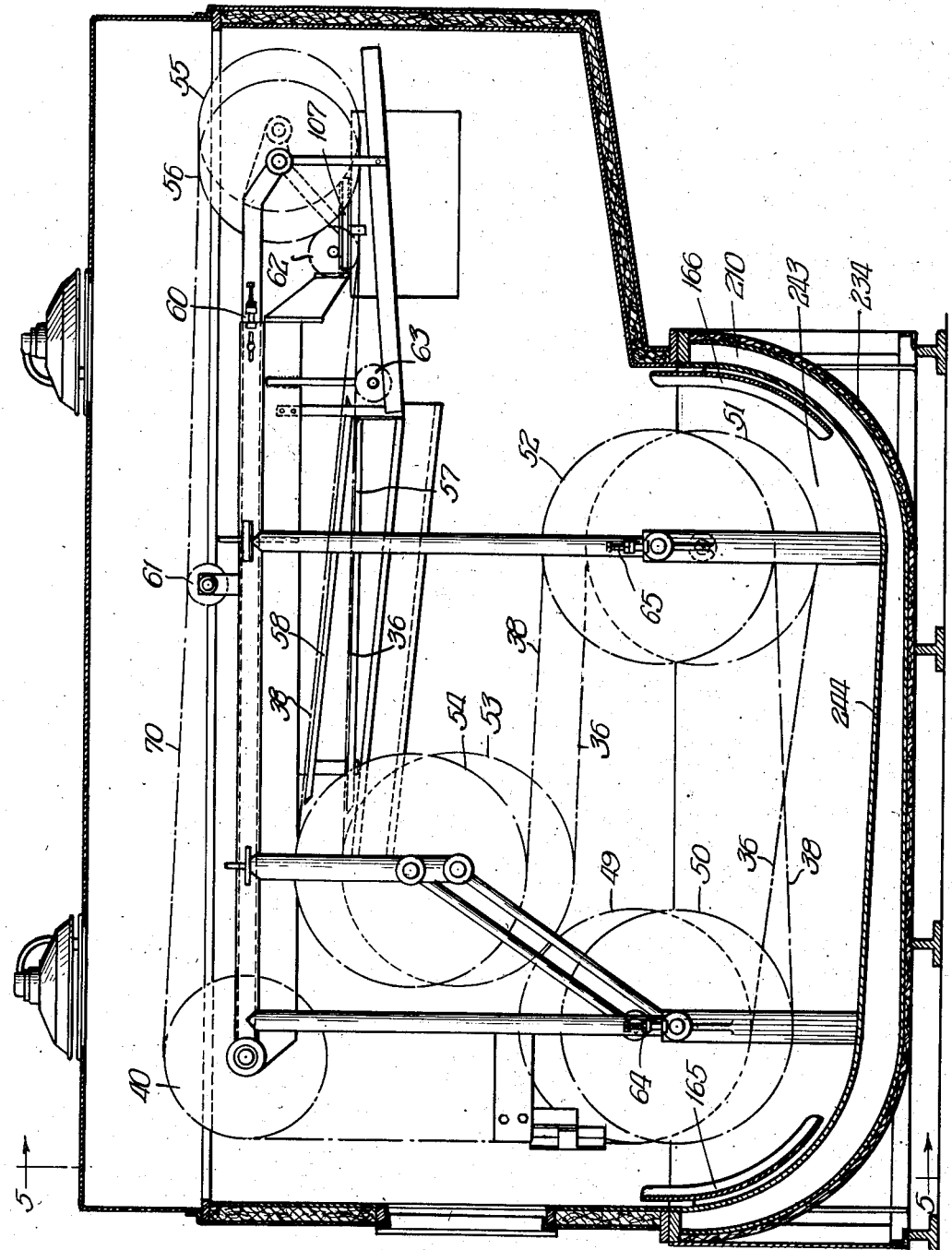

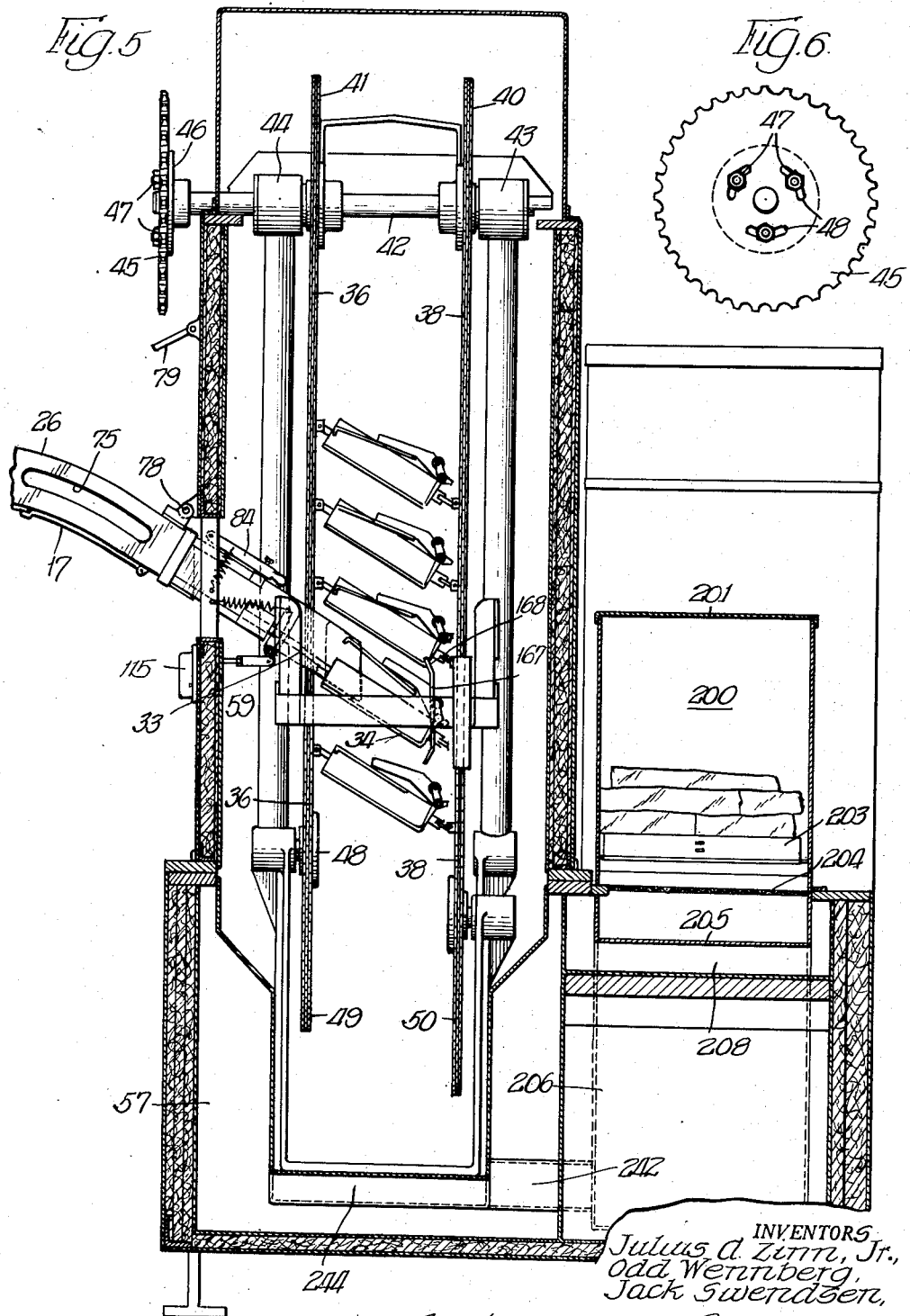

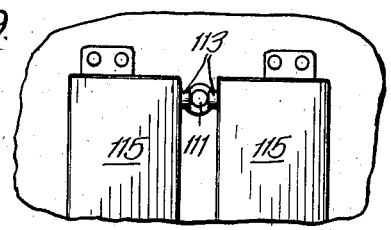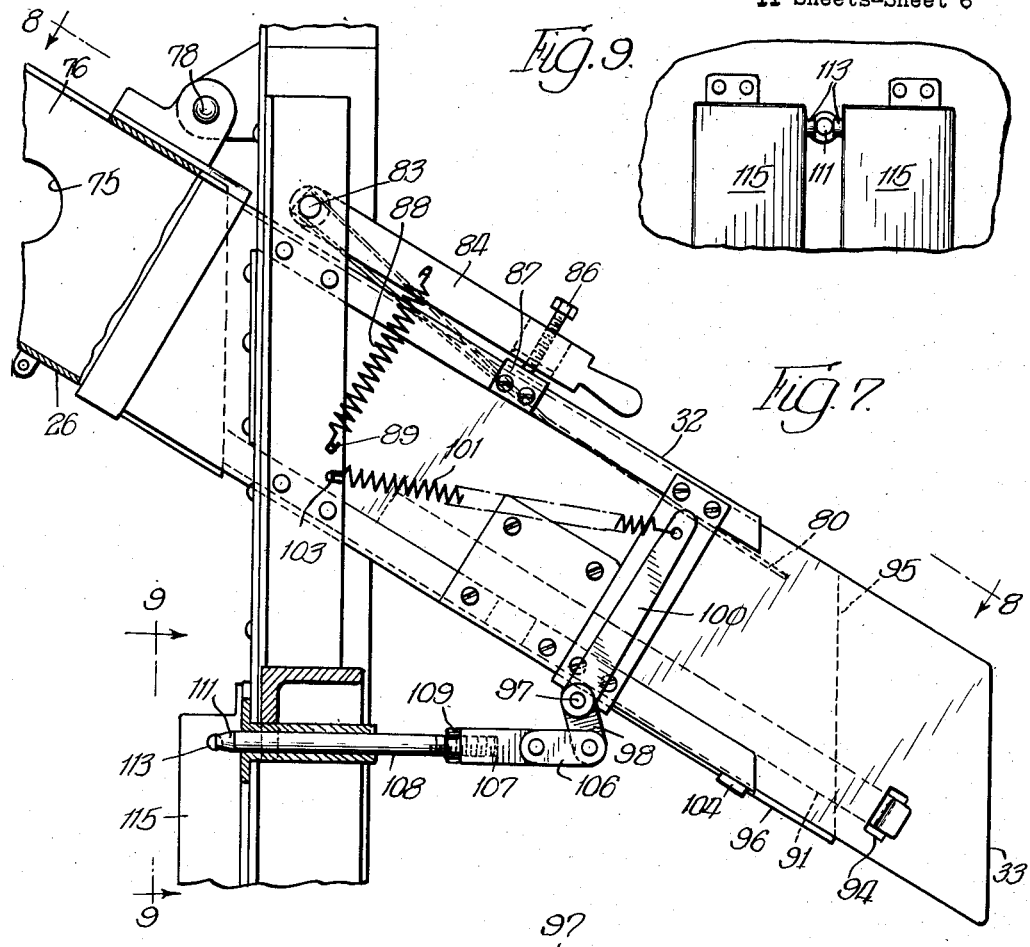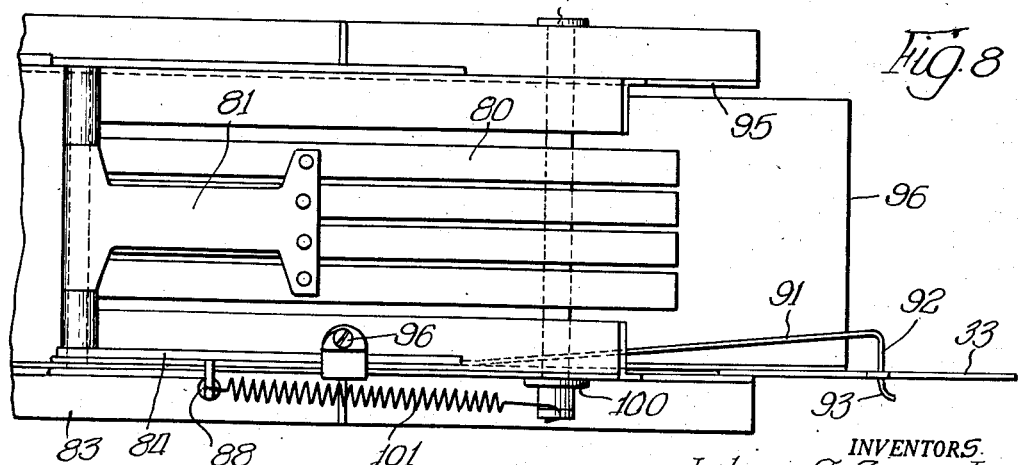

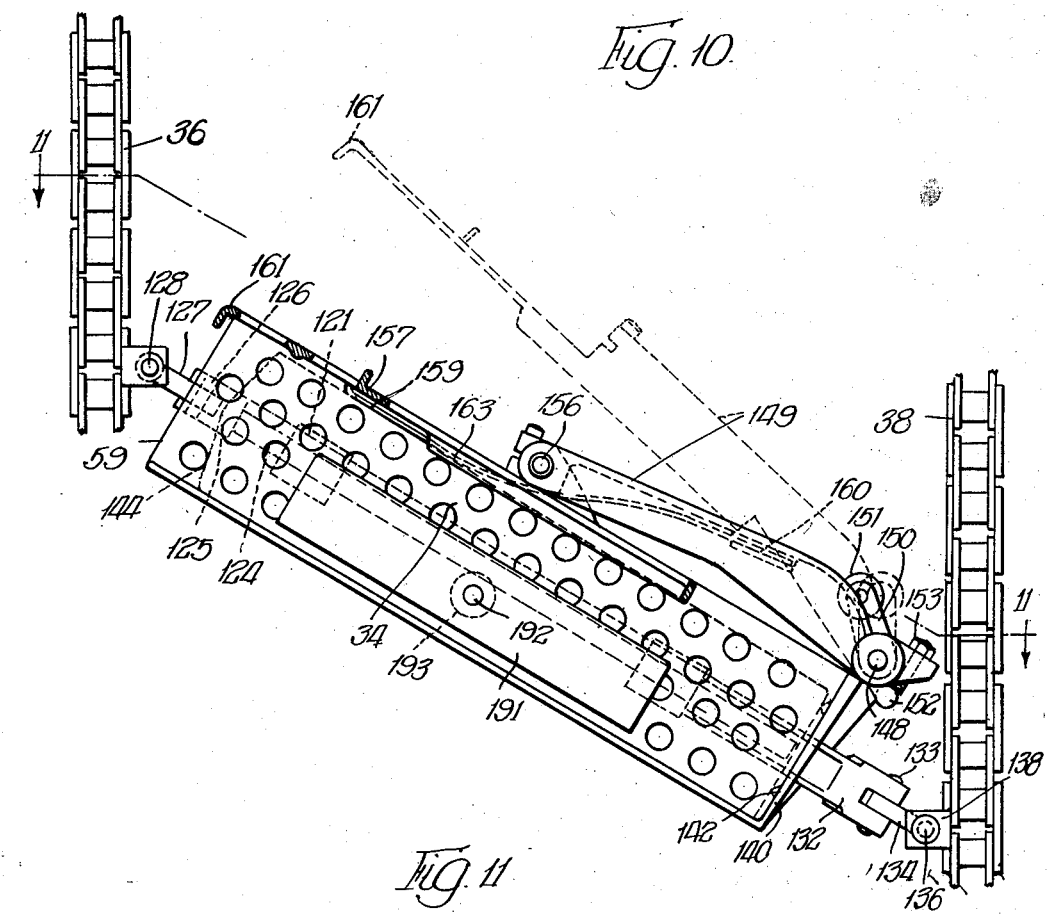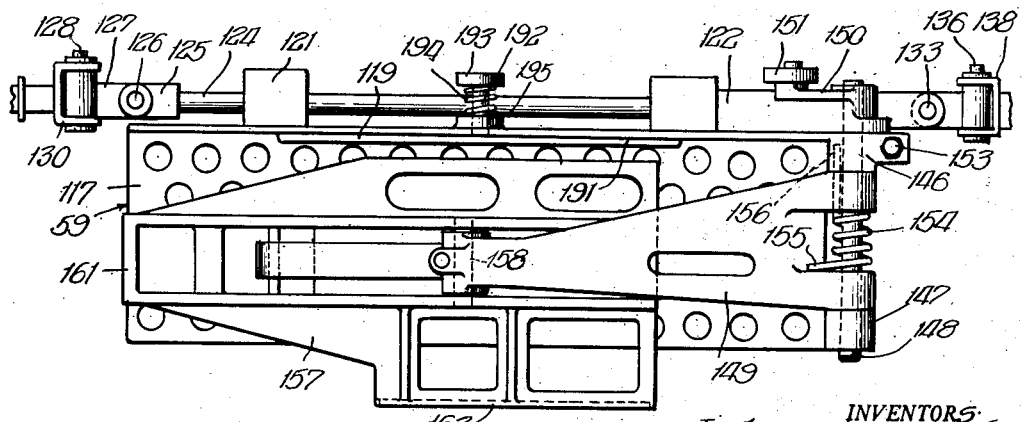

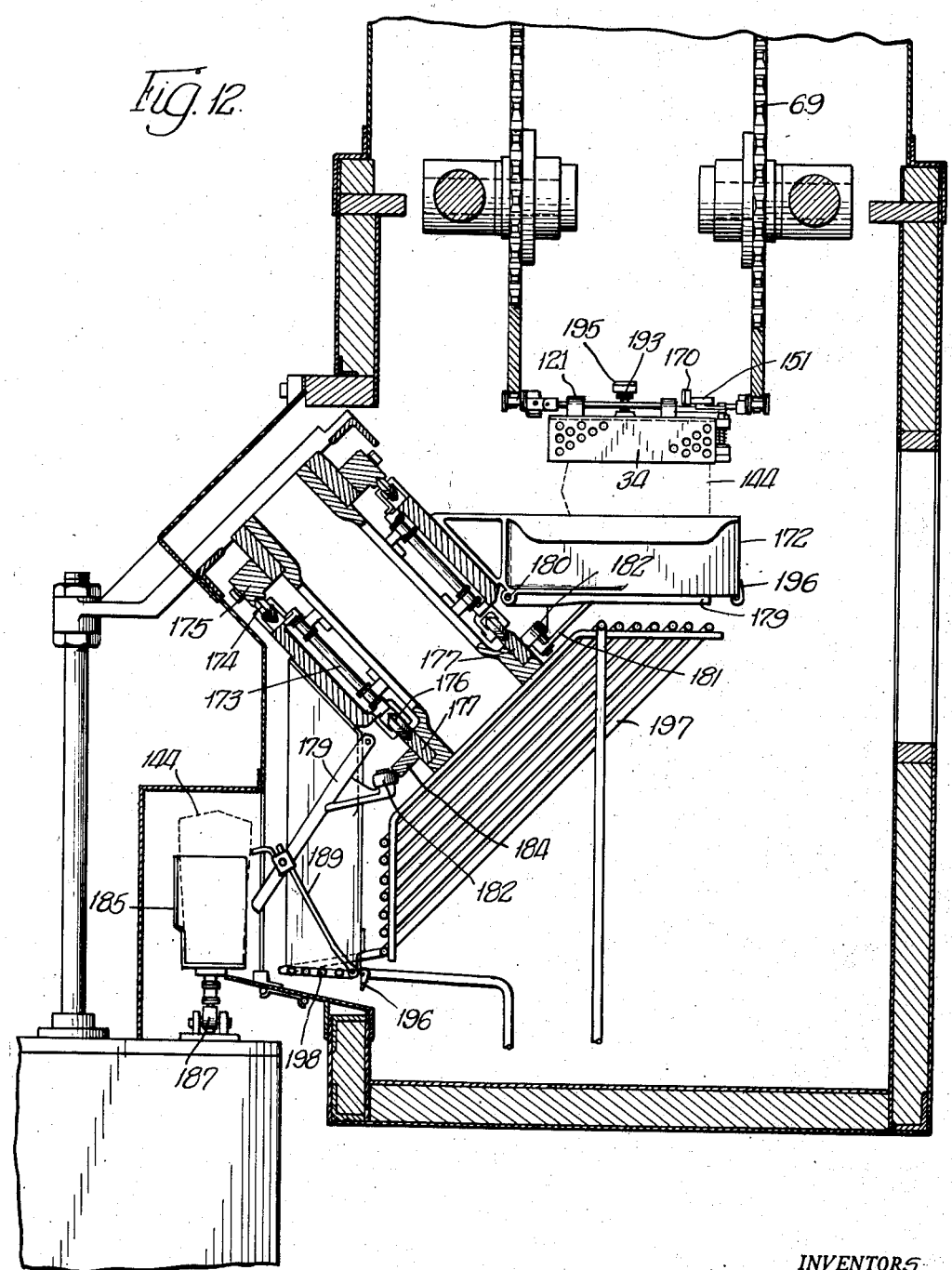

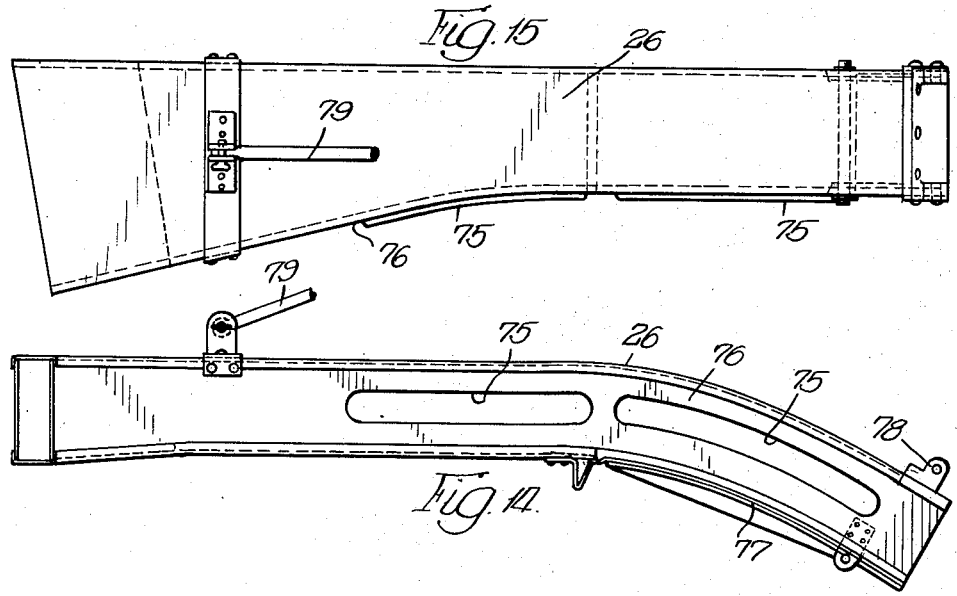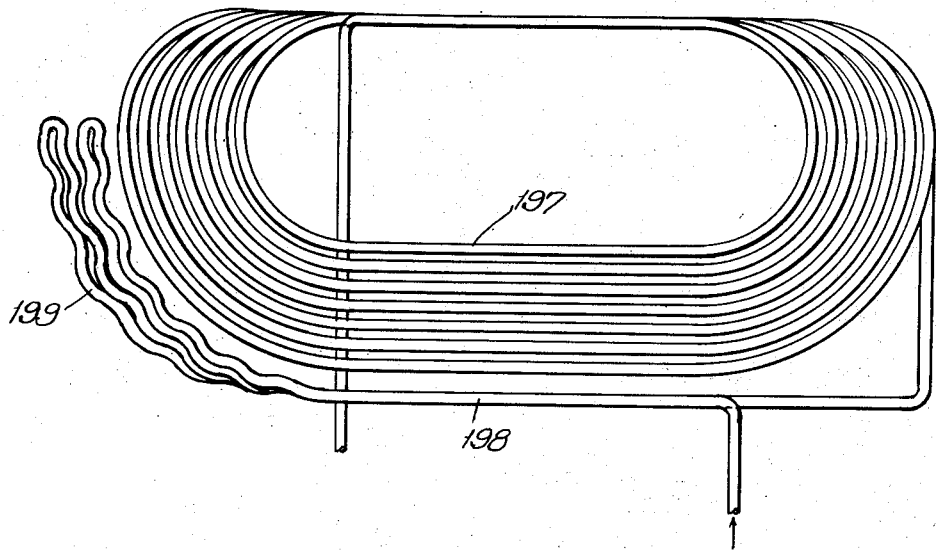

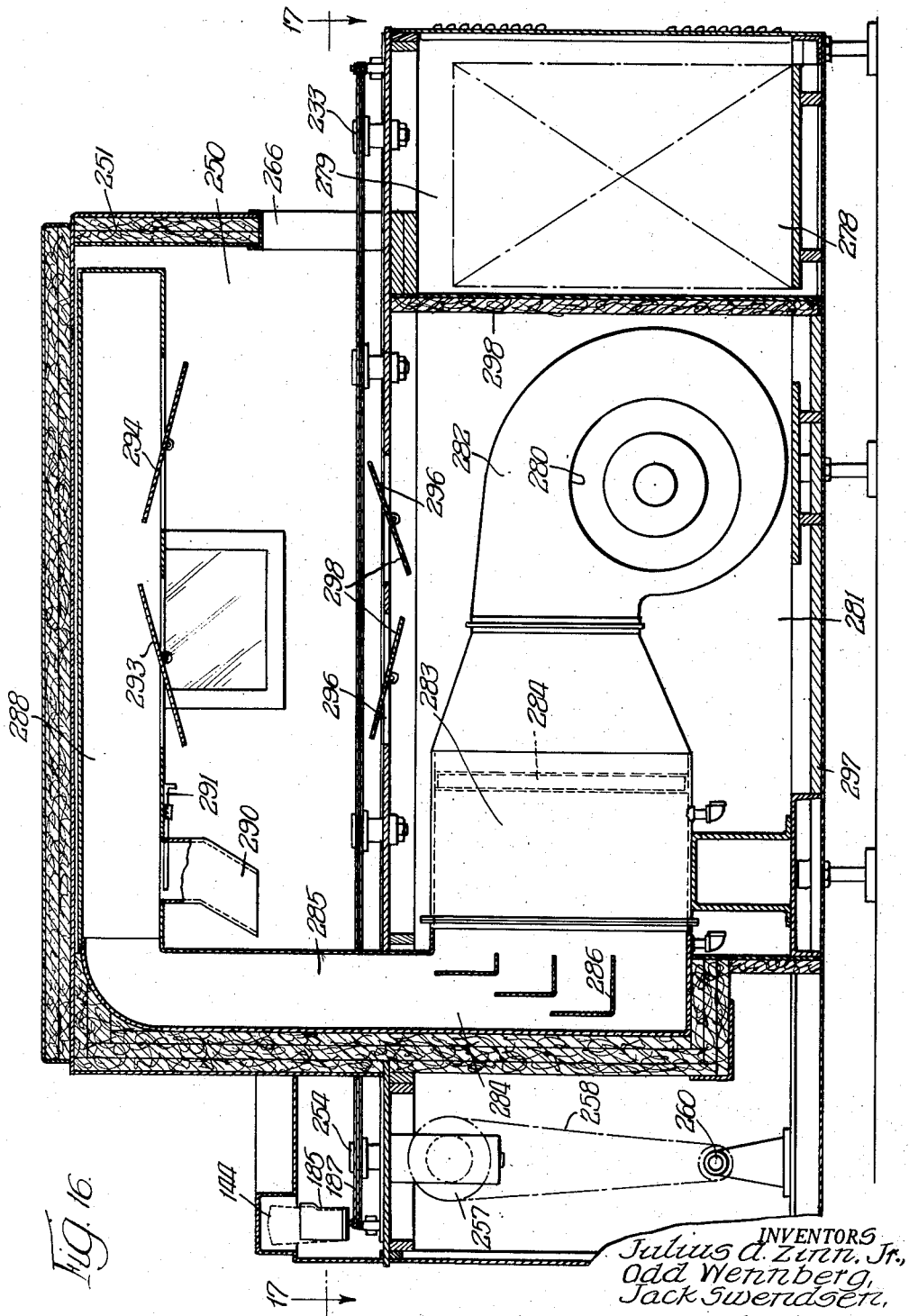

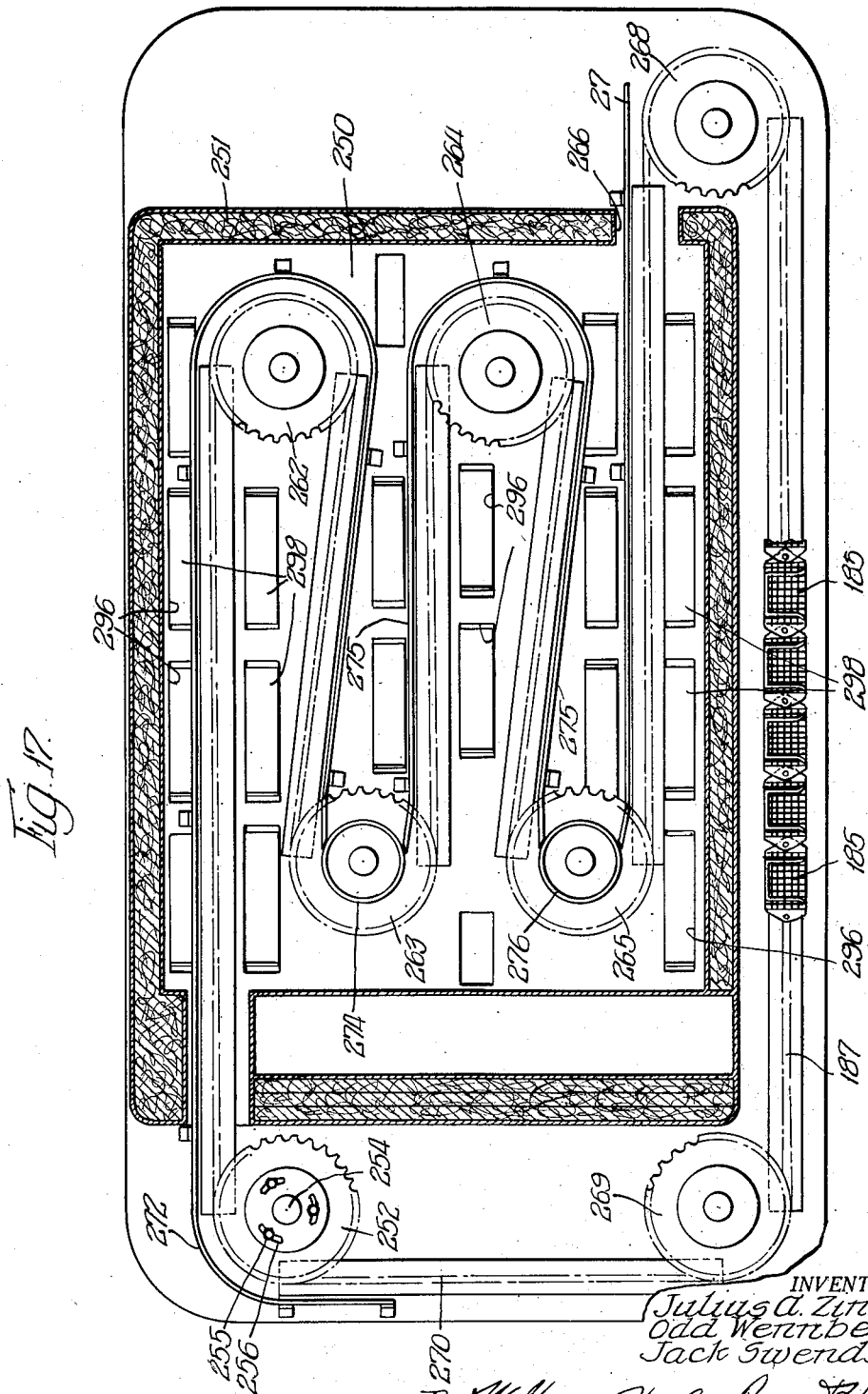

Patented Sept. 8, 1953

2,651,284

UNITED STATES PATENT OFFICE 2,651,284

WAX COATING APPARATUS

Julius A. Zinn, Jr., Chicago, Ill., and Odd Wennberg, Manhasset, and Jack Swendsen, Lynbrook, N. Y.; said Wennberg and said Swendsen assignors to said Zinn, Jr.

Application June 1, 1950, Serial No. 165,476

10 Claims. (Cl. 118—6)

This invention relates to a new and improved apparatus for the application of a wax coating to formed cartons and for the cooling and hardening of said coatings. More particularly the invention relates to a construction of this character which is continuously operated and suitable for direct association with a carton forming machine which is also continuously operated.

Apparatus has heretofore been in use for forming cartons of cardboard or the like from flat blanks and other apparatus has been in use for passing the formed blanks through a heated bath of wax, such as paraffine or similar material. Such apparatus has, however, been intermittent in operation with a step by step movement of the carton machine and waxer, the cycle of operation being stopped for loading the apparatus and delivering the product therefrom. The stop and go forms of apparatus taking a single carton at a time are comparatively low in production since they canont be operated efficiently at high speeds due to shock and wear caused by repeated stops and starts. To give larger production, some stop and go machines take a plurality of cartons in parallel, but these machines generally require longer stops for loading and are therefore slow and, in addition, are bulky requiring large heating, wax bath and cooling facilities which are costly.

It is an object of the present invention to provide an apparatus for applying wax to cartons and for cooling the applied wax, which apparatus is capable of continuous operation at relatively high speeds.

It is a further object to provide such an apparatus which will apply and cool a uniform and smooth layer of wax.

It is an additional object to provide apparatus in which the time of immersion of the cartons in the bath may be accurately controlled for variable speeds at which cartons are blown in or otherwise introduced into the waxer.

It is also an object to provide apparatus in which the cartons are drained of excess wax in a heated chamber and thereafter transferred to a cooling chamber for rapid and continuous cooling of all surface areas.

It is another object to provide a construction in which cartons having an open end and a closed end are introduced into the wax bath with the closed end lower than the open end and are removed from the bath with the open end lower than the closed end.

It is a further object to provide a construction including endless conveyors for the cartons, the movement and the relative location of the conveyors being adjustable to provide efficient loading, unloading and transfer operations while all elements are in continuous motion.

It is an additional object to provide a construction in which the wax feed to the wax bath and the wax level in the bath are automatically controlled.

It is also an object to provide a construction in which means are provided for controlling the feed of cartons to the apparatus and for stopping the apparatus in the event of jams.

It is another object to provide apparatus of this character in which cartons are positively held in baskets carried by conveyors, with means for opening the baskets at feed and delivery points.

It is a further object to provide a waxer construction including positively operating means for receiving cartons from the baskets on the conveyors and positively delivering them from the apparatus.

It is also an object to provide an apparatus in which the cartons are introduced continuously into the apparatus one at a time, preferably by being blown one at a time from the carton making apparatus as they are completed.

It is an additional object to provide apparatus which is efficient and rapid in operation and adapted for commercial production and use.

Other and further objects will appear as the description proceeds.

Certain preferred embodiments of the invention are shown in the accompanying drawings, in which—

Figure 1 is a plan view showing the waxing machine and cooler of the present invention associated with a suitable gluer-feeder and package maker;

Figure 2 is a front elevation of the waxing machine and cooler shown in Figure 1;

Figure 3 is a partly broken away section taken on line 3—3 of Figure 1;

Figure 4 is a vertical section taken on line 4—4 of Figure 1;

Figure 5 is a transverse vertical section taken on line 5—5 of Figure 4;

Figure 6 is a fragmentary face view of the drive sprocket of Figure 5;

Figure 7 is a fragmentary elevation, on an enlarged scale, showing the receiving chute for the waxer;

Figure 8 is a plan view of the chute construction shown in Figure 7 taken on line 8—8 of Figure 7;

Figure 9 is a fragmentary view taken on line 9—9 of Figure 7;

Figure 10 is a fragmentary view, on an enlarged scale, showing one of the carton receiving and holding baskets in the waxer;

Figure 11 is a plan view of the construction shown in Figure 10;

Figure 12 is a fragmentary vertical section showing the mechanism for transferring cartons from the waxer to the cooler;

Figure 13 is a fragmentary elevation showing the heating coils of Figure 12;

Figure 14 is a side elevation of the outside chute for receiving cartons from the carton maker;

Figure 15 is a plan view of the chute of Figure 14;

Figure 16 is a vertical longitudinal section through the cooler taken on line 16—16 of Figure 1; and Figure 17 is a horizontal section of the cooler taken on line 17—17 of Figure 13.

Referring first to Figure 1, the gluer and feeder 21 indicated at the left of the figure may take the form of construction shown in the co-pending application of Julius A. Zinn, Jr., Serial No. 102,345, filed June 30, 1949. The transfer conveyor 23 may take the form of the conveyor shown in the patent to Julius A. Zinn, Jr. and Michael J. Wilson, No. 2,480,177, issued August 30, 1949. The carton or package maker 24 may take the form of the package maker of the co-pending application of Julius A. Zinn, Jr., Serial No. 752,364, filed June 4, 1947, now Patent No. 2,547,899, issued April 3, 1951.

The carton or package maker is of the continuous rotary type and completed cartons are discharged by compressed air from the mandrels on the carton or package maker into the transfer chute 26 through which they pass into the waxing machine 28. As will be described hereafter in detail, the fully formed cartons are carried in baskets in the waxing machine in a tortuous path through a bath of wax, such as paraffine, remaining in the bath for a predetermined period of time at a predetermined temperature. After leaving the bath, the cartons are tilted so as to drain excess wax and are then transferred to a conveyor operating in the cooler 30. This conveyor carries the formed and waxed cartons through the cooler in a tortuous path so as to allow them a predetermined period in a cool atmosphere at a predetermined temperature and to cool the cartons at a speed such that the whole system of apparatus may be operated at the maximum effective speed of the package maker 24. From the cooler 30, the completed cartons are discharged to any suitable apparatus, not shown. This apparatus may take the form of filling and closing machines or merely apparatus for stacking and boxing the finished cartons for shipment.

Referring next to Figure 5, the cartons pass through the chute 26 into the feed control assembly 32, which is shown in detail in Figures 7, 8 and 9. From the lower end of this assembly at 33, the cartons pass individually into baskets 34 which are supported at their opposite ends upon chains 36 and 38. As shown in Figure 5, these chains 36 and 38 pass over upper sprockets 40 and 41 carried on shaft 42 supported in the journals 43 and 44. The shaft 42 is driven from a suitable source of power through the sprocket drive wheel 45. This wheel 45 is adjustably mounted on hub 46 by bolts 47 fitting slots 48, as shown in Figure 6. The relative location of the baskets 34 and the speed of movement of the conveyor must be accurately synchronized with the feed from the carton maker or other feed apparatus. At the lower end of the vertical run shown in Figure 5, the chains 36 and 38 pass over the lower sprocket wheels 49 and 50.

Referring to both Figures 4 and 5, it will be apparent that lower sprocket 49 is mounted on an axis above the axis of the similar sprocket 50. The lower longitudinal passes of chains 36 and 38 then pass over the sprockets 51 and 52 respectively, which sprockets have the sprocket 52 on a higher axis than the sprocket 51. From sprockets 51 and 52, the chains 36 and 38 have a reverse, approximately horizontal run to sprockets 53 and 54, the sprocket 54 rotating about a higher axis than sprocket 53. From sprockets 53 and 54, the chains 36 and 38 have a generally horizontal run in the reverse direction to the sprockets 55 and 56 which are offset laterally from which they return in a generally horizontal run to sprockets 40 and 41.

It will be apparent, from considering the elevation of the baskets 34 shown in Figures 5 and 10, that during their vertical run past the end 33 of the fixed assembly 32 the baskets are tilted at an angle of approximately 30° to the horizontal so that their openable upper end 59 passes as a substantial continuation of the feed or admission assembly 32, as shown in Figure 5. Because of the relationship of the axes of sprockets 49 and 50, when the containers 34 pass around sprockets 49 and 50 to their lower run as shown in Figure 4, the containers 34 are further tilted so that their lower closed ends enter the bath below and in advance of the open end. Since the open end of the cartons is towards the openable end of the baskets 34, this movement assures that the lower closed ends of the cartons enter the wax bath first and no air is trapped in the cartons. As the baskets 34 reach the lower runs of chains 36 and 38, the lead of the lower ends of the baskets is lost and the baskets travel laterally. The lead of the basket end carrying the closed end of the carton is regained as the conveyor rounds sprockets 51 and 52. The cross lower runs of chains 36 and 38, as shown in Figure 4, vary the vertical tilt of the cartons to insure full contact with the wax.

In order to drain the wax from the cartons, it is necessary to tilt the cartons to bring their open ends lower than their closed ends, and this is accomplished by having the chain 38 connected to the bottoms of containers 34 pass over the sprocket pulley 52 while chain 36 connected to the upper end of containers 34 passes over the lower sprocket pulley 51. After leaving the pulleys 51 and 52, the draining positioning of the containers 34 and cartons therein is maintained by having the chain 38 extend over the pulley 54 while the chain 36 extends over the somewhat lower pulley 53. The two chains again become parallel under the pair of pulleys 55 and 56 which are in the same horizontal plane. The lateral offset of pulleys 55 and 56 is such as to make the total length of the two chains 36 and 38 the same. The adjusting means 60 serve to take up slack in chain 38 by moving pulley 56 to the right or left and similar means are provided in connection with pulley 55. Similar adjusting means 64 and 65 are located on the supports for the sprockets 50 and 52, and the same type of adjusting means are provided for the rear sprockets 49 and 51. It will be understood that the various adjustments must be coordinated to provide equal lengths for the two chains 36 and 38. Such adjustments allow modification of the angle of lead of one end of the baskets 34 over the other end at different points along the conveyor.

An idler pulley 62 is located near sprocket 56 to insure a horizontal run of chain 38 for a short stretch during which the cartons are discharged from the baskets 34 into the transfer mechanism shown in Figures 12 and 13. A similar supporting idler pulley 63 holds up chain 36 so that it will have a horizontal run in the same plane as chain 38 at this discharge point. Drip pans 57 and 58 are located under this upper run of the conveyor to prevent wax dripping onto cartons in the lower run. From pulleys 55 and 56, the two chains pass in a parallel run over idler pulleys 61 back to the pulleys 41 and 40.

Referring to Figures 5, 14 and 15, the feed chute 26 is shown with its side walls provided with outwardly pressed portions 75 providing a substantial clearance for the cartons, which are blown bottom foremost into the chute from the carton machine or package maker 24, shown in Figure 1. These portions 75 provide space for passage of air trapped ahead of the cartons and facilitate their movement. The sides 76 of the chute 26 may be formed from sheets of transparent plastic so that the feed of the cartons may be visible. A hinged door 77 is provided at the bottom of the chute and this may be opened to remove any cartons which become jammed in the chute. It has been found that this door 77 and its opening serve to eject automatically cartons whose bottoms are not fully sealed or which become unsealed due to the air blast used to blow them from the carton machine mandrels through the chute 26 to the waxer. A carton with a fully closed bottom is blown at high speed through the chute 26 and is deflected in a downward curve by contact with the inner face of the curved upper surface of the chute above the door 77. If the carton bottom flaps are not properly stuck together and the bottom is opened or partially opened by the air blast, the carton is not moved so rapidly by the blast and tends to slide along the bottom of chute 26 and drop through the opening if door 77 is left open. The bottom flaps which are unstuck also may create an air drag and drag against the chute walls, which also slows is speed and helps cause it to drop out of the door opening. The chute is hingedly supported at 78 to the frame of the waxer so that it may be swung upward to clear the space between the package maker 24 and the waxer 28 to provide clearance for repair and adjustment of the machine. For this purpose, the inclined support bar 79 may be disconnected from the chute 26.

Referring next to Figures 7 to 9 inclusive, the chute 26 discharges into the feed control assembly 32. This assembly includes a top control member 80 which consists of resilient fingers held together by the member 81 and is pivoted on the cross shaft 83. The resistance adjustment arm 84 is positively secured to the shaft 83 and is provided with an adjustable screw 86 bearing against the lug 87 which is secured to the upper edge of the assembly 32. The tension spring 88 has one end secured to the member 84 and the other end secured to a pin 89 extending from the side wall of the assembly 32. It will be apparent that the resilent fingers 80 are held down by the tension of the spring, and the distance which they extend into the path of the cartons passing into the assembly 32 is controlled by the adjustment of the screw 86.

A lateral guide spring 91 is secured to the inner face of the side of the assembly 32 and has a transverse portion 92 and a reversely bent end 93 extending through a slot 94 in the side member. A bottom gate 96 is connected to the cross pivot member 97 and closes the lower portion of the inner or discharge end of the assembly 32. The spring 91 has a light spring action which urges the cartons against the rear side 95 of the assembly to insure proper delivery to the conveyor basket 34. It has the additional important function that the transverse portion 92 stops any rebound of a carton from the conveyor basket 34 and prevents a rebounding carton from jamming the gate 96 and stopping the machine. The arm 98 is rigidly connected to the pivot member 97 and an upper arm 100 is also rigidly connected to this pivot member 97. The tension spring 101 is connected at one end to the upper end of the arm 100 and at its other end to a pin 103 extending from the side wall of the assembly 32. The gate 96 is provided with a cross member 104 which engages the under side of the side wall of the assembly 32 to limit swinging movement of the gate 96 in the counter-clockwise direction about its pivot member 97.

The arm 98 is connected by link 106 to the inwardly threaded member 107 into which is threaded an end of the switch control plunger 108. This plunger 108 is locked in adjusted position in member 107 by nut 109. The outer end of the member 108 has a conical taper, as shown at 111, and is located between a pair of plungers 113 which, as best shown in Figure 9, operate switches 115. These switches 115 are located in control circuits for operation of the apparatus and are normally closed. It will be apparent that any jam of cartons occurring in the feed assembly 32 or carton with open bottom flaps will depress the guide 96, thus swinging the arm 98 in the clockwise direction and through link 106, member 107 and plunger 108, forcing the tapered end 111 of that plunger to the left, as seen in Figure 7, thus forcing the switch control plungers 113 inwardly into the switches and opening the circuits controlled by these switches. This will automatically stop the apparatus and permit clearing any jam occurring at this point.

It will be understood that it is desirable to continue movement of the conveyor and associated parts in the waxer so as to properly time the waxing of cartons already in that machine and, therefore, these switches 115 normally control circuits which have to do with the operation of the carton machine 24 and its feed apparatus or any other external carton feed apparatus so as to prevent the further feed of formed cartons until the jam has been cleared in the feed to the waxer.

From the feed assembly 32, the formed cartons are discharged into the baskets 34 carried by the conveyor chains 36 and 38. These baskets 34 are shown in detail in Figures 10 and 11. The containers each comprise a fixed lower side wall 117 and fixed inner vertical wall 119, these walls being formed at right angles to each other. The vertical walls 119 have extending therefrom the support lug 121 and the aligned support frame 122. The support rod 124 is rigidly connected to the yoke 125 which is pivotally connected by pin 126 to the transverse yoke 127, as shown at the left of Figures 10 and 11. This yoke 127 is pivotally supported on the pin 128 which is carried in the stirrup 130, the latter being rigidly secured to a link of the conveyor chain 36.

The rod 124 slides freely through lug 121 and its free end also slides freely in the aligned support frame 122. The other end of the frame 122 is provided with a bifurcated portion 132 connected by pivot pin 133 to yoke 134. This yoke 134 is pivotally connected by pin 136 to the stirrup 138 which is rigidly connected to a link of the conveyor chain 38.

The lower side wall 117 and rear wall 119 of the basket are rigidly connected by the fixed bottom wall 140. As shown in Figure 10, this bottom wall is provided with conical projections 142 which keep the bottom of the carton, indicated in broken lines at 144, from engaging the full area of the bottom 140. The upper edge of the bottom 140 is provided with bearings 146 and 147 in which are fitted the pivot pin 148. The cover carrying arm 149 is secured to pin 148 and rotates therewith. The cover actuating arm 150 is also secured to the pin 148 and rotates with that pin. This arm 150 carries the cam engaging roller 151 and, at its opposite end, has the lug 152 extending under the adjusting screw 153 carried by the bearing member 146. The spring 154 is coiled about the pivot 148 and has one end 155 engaging the upper face of the arm 149 while its other end 156 is held by the bearing 146. The spring 154 thus holds the arm 149 downwardly with the lug 152 engaging the under face of screw 153.

The cover 157 is connected to the cover carrying arm 149 by means of the pivot pin 158. The under side of this cover is engaged by the spring 159, one end of which is fitted in a slot in the cover carrying member 149, as shown at 160 in Figure 10. This spring 159 yieldingly holds the outer end of the cover 157 upwardly so that the carton may freely enter the basket when the cover is open. The rear portion of the basket cover 157 is tilted upwardly as it engages the carton 144 when the cover is closed by spring 154. The free end of spring 159 also engages the carton. The cover 157 has the downturned outer end 161 adapted to prevent the carton from moving outwardly of the container 34 to the left, as shown in Figures 10 and 11. The cover member 157 also has the downturned lateral edge 163 which prevents lateral movement of the carton in the direction away from the wall 119. It will be noted that the member 163 extends only over a small portion of the side of the carton. By this construction the carton is positively held in place in the basket by the portions 161 and 163 of the cover 157 and is lightly held by spring 159. The strength of spring 154 and the relationship of the parts is such that there is no tendency to crush the carton, the cover 157 being free to take a position parallel to the adjacent carton surface.

As shown in Figure 4, the waxer is provided at its lower left side with the guide members 165 which are adapted to fit laterally of the portion 163 of the cover member 157 and engage the cartons to guide and hold the cartons from coming out as the baskets 34 pass around the lower pulleys 49 and 50 into the wax bath. Similar guides 166 are provided for the same purpose at the right side to guide and hold the cartons as they leave the bath. As shown in Figure 5, the apparatus is provided with a cam member 167 which has an inturned upper end 168. In the downward movement of the conveyor, the cam engaging wheel 151 of each basket 34 passes behind the inturned end 168 and along the straight portion of the cam member 167 to lift the cover member 157, as shown in Figure 5, so as to permit the carton to enter the basket 34. As the basket passes beyond the cam 167, the cover is returned to its closed position, as shown in Figure 10, by the spring 154.

As seen in Figure 4, the cartons are discharged from the containers 34 as they pass along the straight stretch between idler pulleys 62 and the pair of pulleys 55 and 56 at the right-hand end of the figure. The transfer apparatus has not been shown in Figure 4, but is shown in Figure 12. As each basket 34 passes along this straight stretch, a fixed cam member 170, similar to cam 167, engages the cam wheel 151, throwing the top closure member 157 to the open position or to the rear. This opening movement causes the downwardly extending portion 163 to clear the edge of the carton 144 which drops into the transfer container 172. Means may be provided for mechanically ejecting the cartons from the baskets or they may be blown out by an air jet above the basket. One form of mechanical ejector has been shown on Figures 10, 11 and 12 and comprises a pusher plate 191 inside the back wall 119 of the basket 34 to which is connected a push rod 192 having a head 193. The compression spring 194 encircles the push rod 192 between the boss 195. This spring 194 normally holds the plate 191 in contact with the wall 119. When the cam 195, shown on Figure 12, engages the head 193, the rod 192 is pushed down and the plate 191 ejects the carton. The cam 195 is coordinated with cam 170 which opens the basket 34.

This transfer basket 172 is one of a series supported by the continuous chain 173, the basket 172 being so spaced and the linear speed of the basket 172 so related to the movement of the waxer chain conveyor that a basket 172 passes under each conveyor basket 34 at the proper instant to receive the carton when it is discharged from basket 34. The continuous chain 173 carrying members 172, like the waxer chain conveyor, moves continuously. The chain 173 is provided, as shown, with an upper series of rollers 174 rotating in a fixed track 175 and a lower series of rollers 176 rotating in the lower fixed track 177.

The bottom 179 of each transfer basket 172 is pivoted at 180 and a cam arm 181 carrying a cam roller 182 extends from each bottom. The conveyor 173 moves around its guides and carries with it the members 172 with the cam roller 182 rolling around on the rail 177 until member 172 approaches the vertical at the lower left of Figure 12. At this point, the cam roller 182 strikes the sharp cam rise 184, swinging the parts to the position shown in the lower portion of the figure. This causes the bottom 179 to swing inwardly and thrust the carton 144 into the open pocket 185 carried by the cooler conveyor chain 187. The spring 189, connected to the end 190 of the transfer container 172 and at its other end to the pivoted bottom 179 of that container, serves to hold the roller 182 against the cam rise 184 and to return the bottom to normal position as soon as the carton has been transferred to the pocket 185 and the roller 182 leaves the cam rise 184.

The baskets 172 are provided at their right end, as seen in Figure 12 at the point where they receive the cartons from baskets 34, with a short lip 196 to limit movement of the cartons in that direction. The baskets 172 take a path having a horizontal upper run and conoidal end runs joining the lower vertical run from which the cartons are transferred to the cooler pockets 185.

The heating coils 197 are shaped to be located adjacent the bottom walls 179 of the baskets 172 during this travel, their configuration being shown in Figure 13 as seen from the left of Figure 12. These coils 197 are connected to coils 198 which, as shown in Figure 12, engage the bottom of the carton. The coils 198 have an arcuate portion 199 extending up around the major portion of the left curved end of coil 197, as shown in Figure 13, the coil 197 being bent so as to engage the bottom of the carton as it moves around in one of the baskets 172. These heated coils 198 are not straight but are individually waved in parallel relation so that all portions of the bottom of the carton are wiped to ensure a smooth even layer of wax on the carton bottom as the carton is delivered to the cooler.

The general layout of the control of the wax supply is shown in Figure 3. The wax melting chamber 200 is provided with a removable cover 201 and with electrically heated wax slab support bars 203. The melted wax passes downward through the bars and through the strainer 204 and flows from the inclined surface 205 to the sump 206. The sump 206 and all the immediately adjacent piping are enclosed in a hot water bath 207 so as to prevent solidification of the wax and, also, to maintain the temperature at that desired for coating purposes. This water jacket 207 has a relatively narrow portion 208 below the sloping surface 205 and under the sump 206 and is enlarged to surround the filter 209 and the piping leading to and from the filter. A connected water jacket 210 surrounds the wax bath 243.

The centrifugal pump 211 at the bottom of the sump 206 is driven by the motor 212 through the downwardly extending shaft 214. This pump 211 passes the molten wax through piping 216 in the sump and piping 217 in the water jacket to the filter 209. The outlet pipe 217 leads from the outlet side of the filter and makes a right angle bend leading directly into the wax bath 243 itself which is in the rear of the section shown in Figure 3, its bottom being indicated in broken lines at 244. This pipe 217 is controlled by the rear valve shown in broken lines and having the upwardly extending valve handle 219. This pipe 217 also leads to pipe 221 which passes through valve 222 controlled by handle 223 to the lateral pipe 225. This pipe 225 extends upwardly at 227 to discharge into the trim or storage tank 229. This tank 229 is provided with an insulated covering 230 and a water jacket 231.

An electrical water heater 232 is shown at the lower right of Figure 3, this supplying water at the desired temperature for circulation to the water jackets around the wax bath, the sump and piping, the jacket around the trim tank 229 and also to the coils 197 and 198 shown in Figures 12 and 13. As shown in Figure 3, the hot water jacket 207 surrounding the sump 206 and the filter 209 and related piping is enclosed in an insulating covering 233. The wax bath water jacket 210, shown in Figure 4, is also enclosed by an insulating covering 234. While an electrical water heater has been shown in Figure 3, it will be understood that other means, such as steam pipes for example, may be used to heat the water for the water jackets. Also, the trim tank 229 may be provided with immersion heating means such as steam coils or electrically heated plates or coils. The motor 236 provides a pump to maintain circulation, and the detailed piping and circulatory system forms no part of the present invention and need not be described in further detail. Suitable thermostatically controlled valves may be provided to maintain the desired temperature and circulation. One such thermostat is indicated at 238, a thermostatic control line 239 leading to valve 240.

The sump 206 is directly connected through passage 242 to the lowermost portion of the wax applying or carton dipping tank 243, the outline of which is indicated at 244 in broken lines in Figure 3. This opening is covered by screen 248. The float 245 is connected by rod 246 to a control unit 247 which controls the supply of heating current to the electric melting bars 203. This float 245 and its connecting rod 246 may be so adjusted relative to the control device 247 as to maintain the molten wax at a desired level. It will be understood that the level of wax in the sump 206 will be the same as the level of wax in the waxing tank 244 since the two directly communicate through the passage 242.

Therefore, the control device serves to maintain the level in the actual waxing tank at the desired point. This level may be held at different points under different operating conditions. For example, certain types of board used in making cartons may required greater time of immersion than other types of board. The board will also vary in thickness with the size of cartons and the contents for which they are adapted. An additional feature which may require modification of the level is change in speed of the apparatus. The waxing apparatus must be timed to register exactly with the speed of the carton maker or other apparatus supplying cartons to be waxed. This is essential, since the container 34 on a conveyor must be opposite the receiving opening at the exact instant when a carton is fed. It will be apparent that, if the conveyor is operated more slowly, the level of the molten wax in the bath must be lowered if the carton is to be immersed for the same length of time. Conversely on speeding up the waxer conveyor, the wax level must be raised. The automatic controls may be set to maintain the desired depth and may be readily adjusted to different speeds so that an apparatus is provided which is adapted to variable speed operation throughout a substantial range.

The wax melting apparatus included in the chamber 200 may also be provided with an automatic control to indicate when additional slabs of wax should be supplied to the melting chamber. This may be a thermostatic control operated by a rise in temperature of the bars 203 when they are not covered with wax and wax is consequently not drawing off heat as it is melted.

The cooler is shown in Figures 16 and 17. As clearly shown in Figures 17, the conveyor chain 187 carries the open-sided pockets or carton conveying carriages 185 through a tortuous path. These pockets 185 are larger than the cartons so that the cooling air has access to the sides of the cartons and both the sides and bottoms of the pockets are perforated so as to permit the cool air to flow around the cartons. Portions of the conveyor chain 187 are located outside of the cooling chamber 250 in order to receive and discharge the cartons. The chamber 250 is enclosed in the insulated housing 251. The chain 187 is driven by means of sprocket 252 which is adjustably secured to a hub on vertical drive shaft 254 by means of the screws 255 fitting through arcuate slots 256. As shown in Figure 16, the shaft 254 is driven through a gear 257 which, in turn, is driven by chain 258 from a horizontal driven shaft 260. It will be understood that the movement of the conveyor chain 187 must be synchronized with the movement of the conveyor and transfer apparatus in the waxer so that an open-sided pocket 185 is in proper position to receive each carton 144 as it is ejected from its transfer basket 172.

The conveyor chain 187 moves in a clockwise direction about sprocket 252, passing about idler sprockets 262, 263, 264 and 265 within the cooling chamber 250. It passes out of that chamber through an opening at 266 and around idler sprocket 268 to idler sprocket 269 from which it returns to the drive sprocket 252. The cartons are fed to the open-sided pockets 185 as they pass along the run 270 of the cooler conveyor extending between idler sprocket 269 and drive sprocket 252. A continuous reversely bent guide member 272 is provided opposite the outer open face of the pockets 185 so as to retain the cartons in the pockets, extending around sprocket 252, to and around sprocket 262 and back to sprocket 263, terminating at 273 adjacent flange 274. The upstanding circular flange 274 is carried by and rotates with sprocket 263 and is closely adjacent the open side of the pockets 185 as they round that sprocket so that it functions to hold the cartons 144 in the pockets. A generally U-shaped guide 275 extends from adjacent rotating flange 274 around sprocket 264 and back to a point adjacent a circular flange 276 carried by sprocket 265. In the construction shown, a straight guide 277 extends from circular flange 276 to a point outside the discharge opening 266. It will be understood that guide 277 may be extended adjacent the conveyor and pockets 185 to a point adjacent the location where it is desired to discharge the cartons from the pockets. It will be understood that the exact point of discharge of the cartons is immaterial and that they may be discharged at any point after they leave the interior of the cooling chamber 250, a deflecting spring or its equivalent ejecting means being located at the proper point for transferring the cartons to another conveyor or to packaging or filling apparatus.

As shown in Figure 16, refrigerating apparatus 278 of any desired type is contained in chamber 279 at the right end of the cooler assembly. This apparatus cools coils located in the path of the air. Air is drawn in through the lateral opening 280 in fan chamber 281 and discharged by fan 282 into the housing 283. In the housing 283 the air passes through the filter 284. From housing 283 the chilled air moves upwardly through passage 285. A plurality of deflecting vanes 286 are provided as the air turns upwardly to assist in guiding its change of direction. It moves from the upwardly extending passage 285 into an upper horizontal passage 288. A short downwardly and rearwardly directed passage 290 leads from the lower portion of passage 288 adjacent its left end. The amount of air flowing through passage 290 is controlled by slide 291. The remainder of the air passes out of the lower face of passage 288 through openings controlled by the tiltable deflecting doors 293 and 294 and downwardly into the chamber 250. The short downwardly directed passage 290 serves to direct a blast of chilled air downwardly into the open upper ends of the cartons 144 shortly after they enter the chamber 250 to thus quickly chill the interior coating of the cartons. The main circulation of chilled air in the chamber 250 serves to continue the cooling so that the wax coating has hardened sufficiently for all practical handling and filling purposes by the time the cartons leave the chamber 250 through the opening 266.

As best shown in Figure 17, the floor of chamber 250 is provided with a plurality of openings or ducts 296 through which the air passes downwardly into fan chamber 281, which chamber is entirely enclosed and covered by insulation 297. All or a part of the ducts 296 are provided with flow control means such, for example, as the tilting doors 298 which may be variously adjusted in different ducts to control and direct the air flow as desired. The cool air is thus recirculated and is filtered as it leaves the fan housing 283 to return to the cooling chamber 250 by way of passages 285 and 288.

While we have shown certain preferred embodiments of our invention, these are to be understood to be illustrative only as it is capable of variation to meet differing conditions and requirements, and we contemplate such modifications as come within the spirit and scope of the appended claims.

We claim:

1. In combination with a carton feeding apparatus, a wax applying apparatus comprising a wax bath, a pair of spaced endless conveyor members, a feed point, said conveyor members passing the feed point and through the bath, carton receiving means comprising containers supported from the conveyor members and extending between the conveyor members, said containers having movable wall portions, said portions being normally closed, and means for opening said portions at the feed point.

2. In combination with a carton feeding apparatus, a wax applying apparatus comprising a wax bath, a pair of spaced endless conveyor members, a feed point, said conveyor members passing the feed point and through the bath, carton receiving means comprising containers supported from the conveyor members and extending between the conveyor members, said support from the conveyor members comprising pivoted links whereby the angular position of the containers relative to the conveyor members may vary.

3. In combination with a carton feeding apparatus, a wax applying apparatus comprising a wax bath, a pair of spaced endless conveyor members, a feed point, said conveyor members passing the feed point and through the bath, carton receiving means comprising containers supported from the conveyor members and extending between the conveyor members, said support from the conveyor members comprising pivoted links and an extensible connection whereby the angular position of the containers relative to the conveyor members may vary.

4. In combination with a carton feeding apparatus, a wax applying apparatus comprising a wax bath, a pair of spaced endless conveyor members, a feed point, said conveyor members passing the feed point and through the bath, carton receiving means comprising containers supported from the conveyor members and extending between the conveyor members, said conveyor members having non-parallel paths in the bath whereby the angularity of the containers is varied in travel through the bath.

5. In combination with a carton feeding apparatus, a wax applying apparatus comprising a wax bath, a pair of spaced endless conveyor members, a feed point, said conveyor members passing the feed point and through the bath, carton receiving means comprising containers supported from the conveyor members and extending between the conveyor members, said conveyor members moving in parallel planes and in non-parallel paths in the bath whereby the angularity of the containers is varied in travel through the bath.

6. In combination with a carton feeding apparatus, a wax applying apparatus comprising a wax bath, a pair of spaced endless conveyor members, a feed point, said conveyor members passing the feed point and through the bath, carton receiving means comprising containers supported from the conveyor members and extending between the conveyor members, a plurality of paired pulleys about which the conveyor members pass, certain of said pairs of pulleys being offset in parallel planes whereby the angular positions of the containers are varied in their travel.

7. In combination with a carton feeding apparatus, a wax applying apparatus comprising a wax bath, a pair of spaced endless conveyor members, a feed point, said conveyor members passing the feed point and through the bath, carton receiving means comprising containers supported from the conveyor members and extending between the conveyor members, a plurality of paired pulleys about which the conveyor members pass, certain of said pairs of pulleys having one pulley offset vertically above the other pulley in the pair whereby the angular positions of the containers are varied in their travel.

8. In combination with a carton feeding apparatus, a wax applying apparatus comprising a wax bath, a pair of spaced endless conveyor members, a feed point, said conveyor members passing the feed point and through the bath, carton receiving means comprising containers supported from the conveyor members and extending between the conveyor members, a plurality of paired pulleys about which the conveyor members pass, pairs of pulleys at the entrance of the conveyor members to the wax bath and the exit therefrom having one pulley offset vertically above the other pulley in the pair, the offsets in the two pairs being reversed, whereby the angular positions of the containers are varied in their travel into through and out of the bath.

9. In combination, a carton feeder and a waxer for cartons or the like, the waxer having a receiving chute, carton containers, a conveyor passing said containers past the inner end of the chute, and means associated with the chute for stopping operation of the machine upon jamming of cartons in the chute.

10. In combination, a carton feeder and a waxer for cartons or the like, the waxer having a receiving chute, carton containers, a conveyor passing said containers past the inner end of the chute, and means associated with the chute for stopping operation of the machine upon jamming of cartons in the chute, said means comprising means resiliently engaging cartons passing through the chute and power control means actuated by predetermined movement of said engaging means.

JULIUS A. ZINN, JR.
ODD WENNBERG.
JACK SWENDSEN.

References Cited in the file of this patent

UNITED STATES PATENTS

| Number | Name | Date |
|---|---|---|
| 728,998 | Sejnoha et al. | May 26, 1903 |
| 1,030,636 | Beadle | June 25, 1912 |
| 1,163,342 | Hurley et al. | Dec. 17, 1915 |
| 2,153,561 | Hothersall et al. | Apr. 11, 1939 |
| 2,294,599 | Hartmann | Sept. 1, 1942 |
| 2,330,124 | James | Sept. 1, 1943 |
| 2,353,721 | Gordon et al. | July 18, 1944 |
| 2,361,959 | Pelosi | Nov. 7, 1944 |
| 2,382,619 | Earp | Aug. 14, 1945 |